(12) United States Patent
Hobson et al.

(10) Patent No.: US 10,375,191 B2
(45) Date of Patent: Aug. 6, 2019

(54) NOTIFICATIONS ON AN ONLINE SOCIAL NETWORKING SYSTEM

(71) Applicant: Microsoft Technology Licensing, LLC, Redmond, WA (US)

(72) Inventors: Adam Christopher Hobson, Sunnyvale, CA (US); Charles Lai, Milpitas, CA (US); Ivan Darmansyah, Seattle, WA (US); Nisheth Joshi, San Jose, CA (US); Jingshu Huang, Mountain View, CA (US); Lewis Brandon Douglas Miller, Sunnyvale, CA (US); Gevorg Kurghinyan, Mountain View, CA (US); Cameron Alexander Lee, San Ramon, CA (US); Jeffrey Zundel, Sunnyvale, CA (US); Karthik Ramgopal, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/825,796

(22) Filed: Nov. 29, 2017

(65) Prior Publication Data

US 2019/0166213 A1    May 30, 2019

(51) Int. Cl.
*H04L 29/08* (2006.01)
*G06Q 50/00* (2012.01)
*H04L 12/58* (2006.01)
*G06Q 10/10* (2012.01)

(52) U.S. Cl.
CPC ............ *H04L 67/26* (2013.01); *G06Q 50/01* (2013.01); *H04L 51/24* (2013.01); *H04L 51/32* (2013.01); *G06Q 10/1053* (2013.01)

(58) Field of Classification Search
CPC ......... H04L 51/24; H04L 51/32; H04L 67/26; G06Q 50/01; G06Q 10/1053
See application file for complete search history.

(56) References Cited

U.S. PATENT DOCUMENTS

| | | | |
|---|---|---|---|
| 8,428,561 B1 * | 4/2013 | Vance | ................... G06Q 10/10 455/412.2 |
| 8,676,626 B1 * | 3/2014 | Vance | .................. G06Q 10/109 705/7.16 |
| 9,621,627 B2 * | 4/2017 | Elias | ....................... G06F 9/445 |

(Continued)

*Primary Examiner* — Kostas J Katsikis
(74) *Attorney, Agent, or Firm* — Schwegman Lundberg & Woessner, P.A.

(57) ABSTRACT

An online social networking system publishes a new notification type to a single entry point controller. Each new notification type uses the same generic schema. The system maps the same generic schema into the same generic input model, and stores the same generic input model into a database. The system reads the same generic input model from the database, converts the same generic input model into a same generic output model, and transmits the same generic output model to a formatter. The formatter receives a request for a notification event, and transmits the notification event to an application programming interface. The formatter is a sole location that is aware of the new notification type. The formatter decorates and formats the notification event based on the same generic output model. The formatter transmits the notification event to the application programming interface, which transmits the notification event to the client device.

20 Claims, 13 Drawing Sheets

(56) References Cited

U.S. PATENT DOCUMENTS

| | | | |
|---|---|---|---|
| 10,255,300 B1* | 4/2019 | Jhingran | G06F 16/21 |
| 2006/0004691 A1* | 1/2006 | Sifry | G06F 16/285 |
| 2009/0070312 A1* | 3/2009 | Patterson | G06F 16/313 |
| 2009/0327437 A1* | 12/2009 | Estrada | H04L 51/24 |
| | | | 709/206 |
| 2010/0057858 A1* | 3/2010 | Shen | H04W 4/21 |
| | | | 709/206 |
| 2010/0076804 A1* | 3/2010 | Jones | G06Q 10/109 |
| | | | 705/7.18 |
| 2010/0169145 A1* | 7/2010 | O'Sullivan | G06Q 10/109 |
| | | | 705/7.19 |
| 2010/0246789 A1* | 9/2010 | Vance | H04W 4/08 |
| | | | 379/201.01 |
| 2010/0250672 A1* | 9/2010 | Vance | G06Q 10/109 |
| | | | 709/204 |
| 2010/0262926 A1* | 10/2010 | Gupta | G06Q 10/109 |
| | | | 715/764 |
| 2010/0278345 A1* | 11/2010 | Alsina | H04L 63/0492 |
| | | | 380/283 |
| 2010/0293105 A1* | 11/2010 | Blinn | G06Q 10/10 |
| | | | 705/319 |
| 2011/0047012 A1* | 2/2011 | Sherman | G06Q 10/10 |
| | | | 705/14.1 |
| 2011/0047182 A1* | 2/2011 | Shepherd | G06Q 10/10 |
| | | | 707/780 |
| 2011/0066664 A1* | 3/2011 | Goldman | G06Q 10/10 |
| | | | 707/812 |
| 2011/0099119 A1* | 4/2011 | Kwiat | G06Q 10/10 |
| | | | 705/321 |
| 2013/0066980 A1* | 3/2013 | Vasters | G06Q 30/02 |
| | | | 709/206 |
| 2013/0067024 A1* | 3/2013 | Vasters | G06F 9/542 |
| | | | 709/217 |
| 2013/0117272 A1* | 5/2013 | Barga | G06F 16/2477 |
| | | | 707/741 |
| 2013/0219429 A1* | 8/2013 | Hirsch | G06F 8/20 |
| | | | 725/37 |
| 2013/0275494 A1* | 10/2013 | Gordon | H04L 67/42 |
| | | | 709/203 |
| 2013/0283305 A1* | 10/2013 | Hirsch | G06F 8/20 |
| | | | 725/14 |
| 2014/0067704 A1* | 3/2014 | Abhyanker | G06Q 10/1053 |
| | | | 705/321 |
| 2014/0074610 A1* | 3/2014 | Bilange | G06Q 50/01 |
| | | | 705/14.58 |
| 2014/0258161 A1* | 9/2014 | Brown | G06Q 10/1053 |
| | | | 705/321 |
| 2014/0280453 A1* | 9/2014 | Mattison | H04L 12/1854 |
| | | | 709/202 |
| 2014/0331165 A1* | 11/2014 | Fang | G06F 17/212 |
| | | | 715/772 |
| 2014/0378189 A1* | 12/2014 | Lenart | H04W 52/02 |
| | | | 455/574 |
| 2015/0052128 A1* | 2/2015 | Sharifi | G06Q 30/0631 |
| | | | 707/727 |
| 2015/0055551 A1* | 2/2015 | Burckart | H04L 49/252 |
| | | | 370/328 |
| 2016/0062721 A1* | 3/2016 | Marcos | G06F 8/61 |
| | | | 345/2.3 |
| 2016/0065714 A1* | 3/2016 | Marcos | H04M 1/7253 |
| | | | 455/556.1 |
| 2016/0065715 A1* | 3/2016 | Marcos | H04M 1/7253 |
| | | | 455/414.1 |
| 2016/0127291 A1* | 5/2016 | Kassab | H04L 51/14 |
| | | | 709/206 |
| 2016/0162488 A1* | 6/2016 | Corradi | G06Q 50/01 |
| | | | 707/734 |
| 2016/0328748 A1* | 11/2016 | Koran | G06Q 30/0269 |
| 2017/0301040 A1* | 10/2017 | Scafaria | G06Q 50/01 |
| 2018/0270178 A1* | 9/2018 | Cernea | G06K 9/00335 |
| 2018/0285910 A1* | 10/2018 | De Kleijn | G07F 17/3274 |

\* cited by examiner

```
                                                    ← 400
    {
      "name": "recipient",
      "type": "Recipient"
    },
    {
      "name": "inAppNotificationType",
      "type": "InAppNotificationType"
    },
    {
      "name": "content",
      "type": {
        "type": "array",
        "items": {
          "fields": [
            {
              "name": "entityUrn",
              "type": "string"
            },
            {
              "name": "parentUrn",
              "type": ["null", "string"]
            }
          ]
        }
      }
    }
```

*FIG. 4*

```
{
  "name": "recipient",
  "type": "Urn"
},
{
  "name": "notificationType",
  "type": "NotificationType"
},
{
  "name": "parent",
  "type": "Urn",
  "optional": true
},
{
  "name": "groupedEntities",
  "type": {
    "type": "array",
    "items": {
      "fields": [
        {
          "name" : "entities",
          "type" : {
            "type" : "array",
            "items" : "Urn"
          }
        }
      ]
    }
  }
}
```

*FIG. 5*

```
{
  "name": "headerImage",
  "type": "Image"
},
{
  "name": "read",
  "type": "boolean",
  "default": false
},
{
  "name": "publishedAt",
  "type": "Time",
  "optional": true
},
{
  "name": "headline",
  "type": "Text"
},
{
  "name": "subHeadline",
  "type": "Text",
  "optional": true
},
{
  "name": "contentType",
  "type": "CardContentType",
  "optional": true
},
{
  "name": "contentText",
  "type": {
    "type": "array",
    "items": "Text"
```

*FIG. 6A-1*

```
    },
    "optional": true
  },
  {
    "name": "contentImages",
    "type": {
      "type": "array",
      "items": "Image"
    },
    "optional": true
  },
  {
    "name": "contentAction",
    "type": "CardAction",
    "optional": true
  },
  {
    "name": "actions",
    "type": {
      "type": "array",
      "items": "CardAction"
    },
    "optional": true
  },
  {
    "name": "cardAction",
    "type": "CardAction",
    "optional": true
  }
```

*FIG. 6A-2*

```
CardAction:
{
  "name": "type",
  "type": "CardActionType"
},
{
  "name": "displayText",
  "type": "TextViewModel",
  "optional": true
},
{
  "name": "actionTarget",
  "type": "Url",
  "optional": true
}

Text:
{
  "name": "text",
  "type": "string",
  "optional": true
},
{
  "name": "attributes",
  "type": {
    "type": "array",
    "items": "TextAttribute"
  },
  "optional": true
},
```

*FIG. 6B-1*

```
{
  "name": "textDirection",
  "type": "TextDirection",
  "default": "USER_LOCALE"
{
  "name": "accessibilityText",
  "type": "string",
  "optional": true
},
{
  "name": "accessibilityTextAttributes",
  "type": {
    "type": "array",
    "items": "TextAttribute"
  },
  "optional": true
}

TextAttribute:
{
  "name": "type",
  "type": "TextAttributeType"
},
{
  "name": "link",
  "type": "Url",
  "optional": true
},
{
  "name": "icon",
  "type": "Icon",
  "optional": true
},
```

*FIG. 6B-2*

```
{
  "name": "start",
  "type": "int"
},
{
  "name": "length",
  "type": "int"
}
```

Image:
```
{
  "name": "attributes",
  "type": {
    "type": "array",
    "items": "ImageAttribute"
  }
},
{
  "name": "accessibilityText",
  "type": "string",
  "optional": true
},
{
  "name": "accessibilityTextAttributes",
  "type": {
    "type": "array",
    "items": "TextAttribute"
  },
  "default": []
},
```

*FIG. 6B-3*

```
{
  "name": "actionTarget",
  "type": "Url",
  "optional": true
}

ImageAttribute:
{
  "name": "sourceType",
  "type": "ImageSourceType",
},
{
  "name": "imageUrl",
  "type": "Url",
  "optional": true
},
{
  "name": "icon",
  "type": "Icon",
  "optional": true
}
```

*FIG. 6B-4*

NOTIFICATIONS ON AN ONLINE SOCIAL NETWORKING SYSTEM

TECHNICAL FIELD

The present disclosure generally relates to the technical field of online social networking systems, and in an embodiment, but not by way of limitation, to generating notifications on online social networking systems, and in particular, the creation of new notification types on online social networking systems.

BACKGROUND

Online social networks provide their members with the ability to connect and communicate with other members. Online social networks include a personal profile for each member, which includes the educational history, work history, and personal interests of the member. Many online social networks also include a job posting functionality, wherein employers can post available jobs and potential employees can search through the posted job openings. Many online social networks further include a notification feature, wherein a member of the online social network receives notifications relating to such things as other members viewing the member's profile, job anniversaries of other members, job changes of other members, birthdays of other members, etc.

DESCRIPTION OF THE DRAWINGS

Some embodiments are illustrated by way of example and not limitation in the accompanying drawings, in which:

FIG. 4 is a diagram of a generic schema used by a notification event producer, an air traffic controller, and a notifications service module in an online social networking system;

FIG. 5 is a diagram of a generic schema created by the notifications service module in an online social networking system;

FIGS. 6A-1 and 6A-2 are a diagram of a generic schema created by a notifications formatter module in an online social networking system;

FIGS. 6B-1, 6B-2, 6B-3, and 6B-4 are a diagram of nested schemas of the generic schema of FIG. 6A;

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

Figure 1:
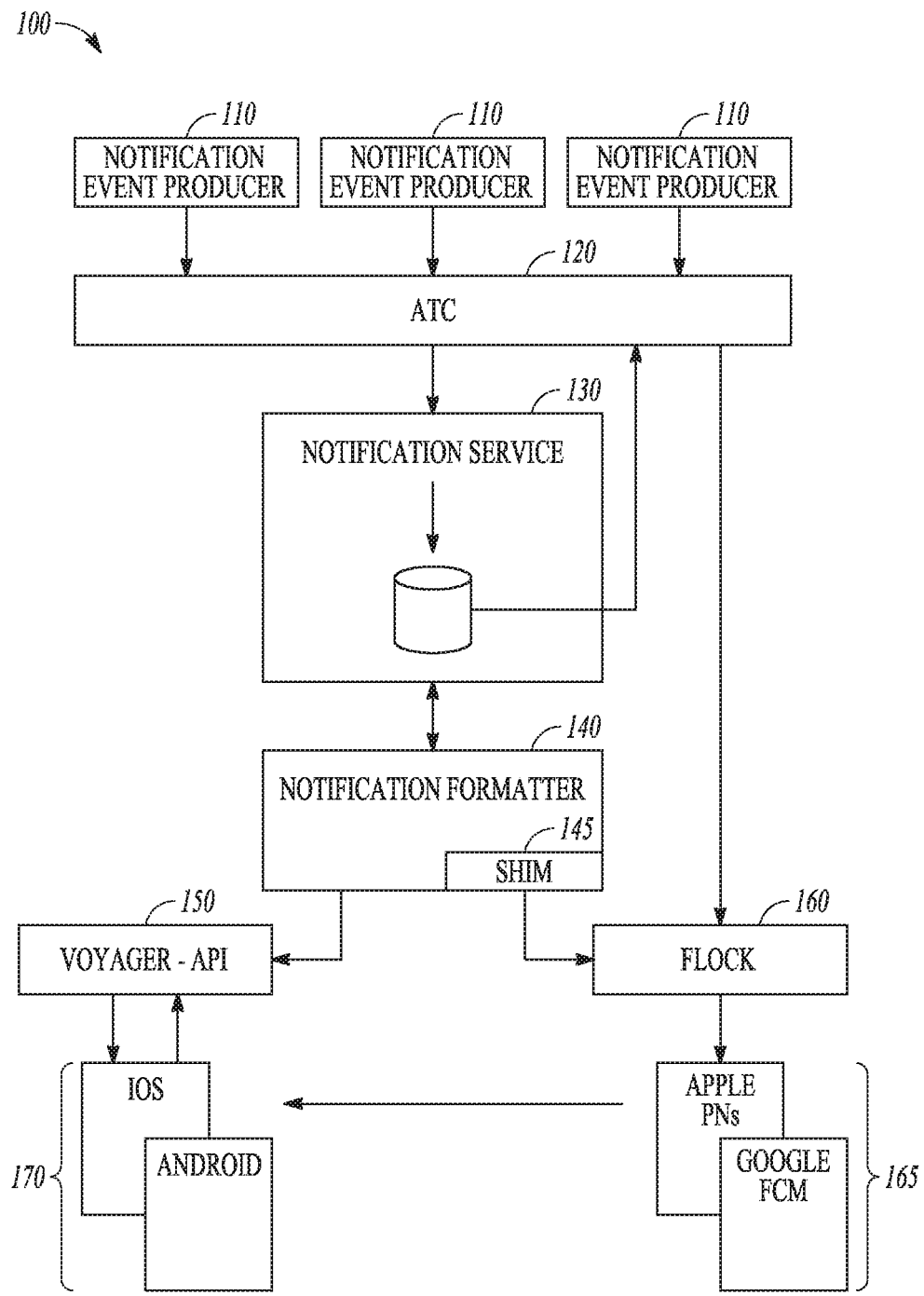
FIG. 1 is a block diagram of an embodiment of a system for creating new notification types in an online social network system.
Figure 2:
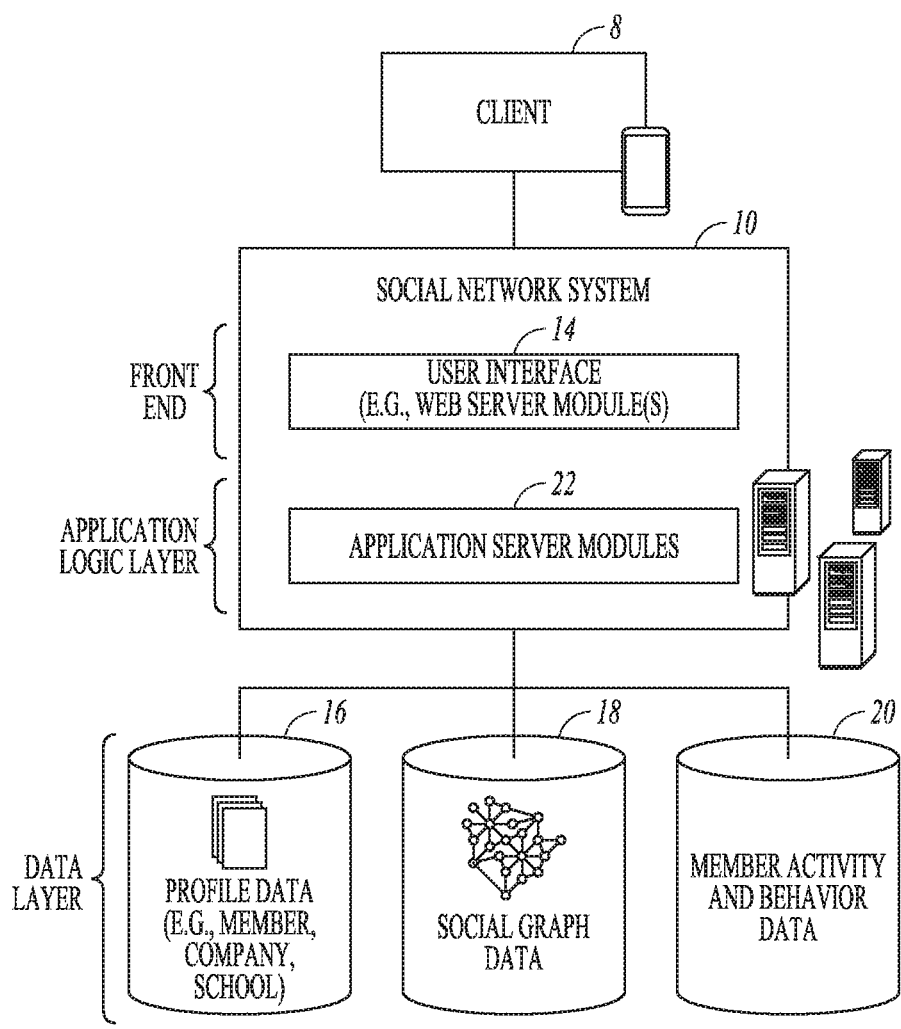
FIG. 2 is a block diagram of the functional modules or components that comprise a computer network-based online social networking system, including application server modules consistent with some embodiments of the invention.

FIG. 1 is a block diagram of a system 100 for introducing new notification types into an online social networking system (such as an online social networking system as illustrated in FIG. 2). The system 100 includes a plurality of notification event producers 110. A notification event producer 110 generates a new notification event that leads to a new notification type. All notification event producers 110 publish any new notification event to an air traffic controller (ATC) 120. The ATC 120 is the only module to which any and all notification event producers 110 generate new notification events. There is no other location in the system 100 to which the notification event producer 110 transmits new notification events. This creates a single point of entry in the system 100 for new notification types, and as will be illustrated herein, this funneling of new notification types to the ATC 120, along with one or more other restrictions in the system 100, provides a notification system wherein a developer can add a new notification in as little as a day's time, rather than a week's time or longer, as was the case with the prior notification systems. This novel architecture of a single port of entry into the system solves the technical problem created by prior notification architectures that had multiple entry points into such prior notification systems, thereby leading to the extensive time periods it took to add new notification types with the prior notification architectures. Additionally, instead of creating a different and distinct schema for each new notification type, all notification event producers 110 use the same generic schema, which simplifies the workings of the system 100. An example of such a generic schema 400 used by the notification event producers 110 is illustrated in FIG. 4. The generic schema 400 of FIG. 4 includes the recipient of the notification, the notification type (e.g., new job of a member), an array of content, and a uniform resource name (URN). The URN points to additional content to be brought into the notification. Any entity in FIG. 4 with a "null" value, such as the parentURN, means that that entity is optional. Additionally, the parentURN is used to tie multiple entities together when there is a common parent, so that multiple notifications can be aggregated into a single entry. For example, if there are multiple comments on a share, the entities are the comments, and the parent is the share. In an embodiment, a notification type is encapsulated in a generic event of the notification event producer 110.

The ATC 120 is configured to listen and look for this same generic schema 400 for any and all new notification types from any and all notification event producers 110. A result of the same generic schema 400, as new notification types are introduced, no new schemas need to be defined. An advantage of this is that in a typical prior notification system, including a typical online social networking system, the approval process for new schemas and the work required to introduce and process new schemas are not insubstantial. Specifically for example, in prior notification systems, it could take weeks to onboard a new notification type, in part because of all the complexities introduced by the absence of any generic schemas.

The ATC 120 communicates with a notification service module 130. Following along the lines of the single, same generic schema 400, the ATC 120 outputs a single generic event type to the notification service module 130. That is, while there are different types of notifications, for example new job notifications and birthday notifications, all of these notifications use the same identifier and same generic schema 400. The ATC 120 implements a default behavior for all incoming new notification types. For example, all new notification types have the same default aggregation rules for aggregating different events that trigger a notification about the same object and the same user interface (UI) push configurations. In short, there are the same default rules for the same behavior with respect to user settings on whether to receive a particular notification type. Consequently, notifications of the same type may be aggregated together. As a further example, if two notification requests are generated for two different members B and C liking member A's post, the two notifications would be aggregated and member A would only see a single notification reporting that members B and C liked A's post. Consequently, the same default logic can be and is applied to any new notification type that is onboarded to the online social networking system. Since any and all new notification types can rely on the default behavior, the ATC 120 need not be modified when new notification types are introduced. In prior notification systems, such ATC modules had to be modified for each new notification type onboarded to the notification system. Notwithstanding, if there is a need and/or a developer wants to, the ATC 120 can still be modified to have custom behaviors for a new notification type.

The notifications service module 130 automatically maps the generic schema 400 into a generic service schema 500. An example of the generic service schema 500 is illustrated in FIG. 5. As can be seen from a comparison of FIGS. 4 and 5, the schemas of FIGS. 4 and 5 are somewhat similar, with a difference being that the schema 500 of FIG. 5 includes group entities. These grouped entities are multiple entities from the input that have the same parent and are already bunched together, grouped by the type of entity. For example, when there are multiple comments and likes on a share, "groupedEntities" can include:

```
"groupedEntities": [
    {
        "entities": [ "urn:li:comment:1", "urn:li:comment:2", "urn:li:comment:3" ]
    },
    {
        "entities": [ "urn:li:like:1", "urn:li:like:2" ]
    }
]
```

The generic service schema 500 then serves as input to the notification formatter module 140. Using the generic service schema 500, the notifications formatter module 140 automatically converts the generic service schema 500 into a generic formatter schema 600. An example of a generic formatter schema 600 is illustrated in FIGS. 6A-1, 6A-2, 6B-1, 6B-2, 6B-3, and 6B-4.

The schema of FIGS. 6A-1, 6A-2, 6B-1, 6B-2, 6B-3, and 6B-4 include all of the details for a notification to be displayed to a member of the online social networking system. The schema 600 as illustrated in FIGS. 6A-1 and 6A-2 include data relating to an image to be used in the notification, a headline to announce the subject matter of the notification, and content of the notification. FIGS. 6B-1, 6B-2, 6B-3, and 6B-4 include the various nested schemas of FIGS. 6A-1 and 6A-2.

Figure 7:
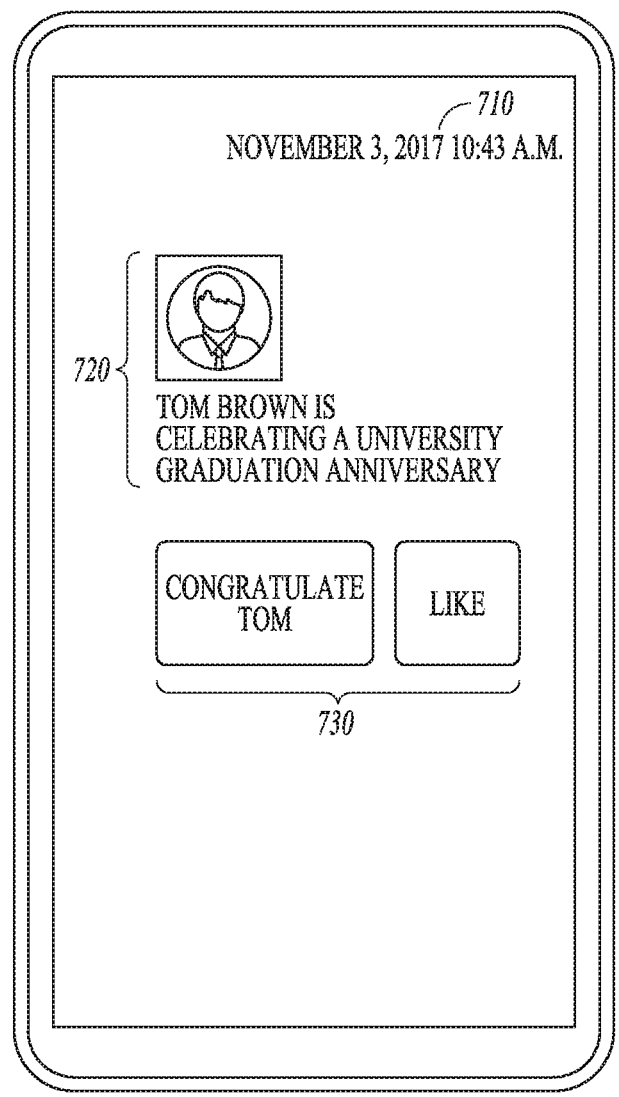
FIG. 7 is an example of a notification event with a new notification type.

The generic formatter schema 600 is tightly coupled with the user interface as illustrated in FIG. 7. This means that, instead of being specific to each notification type, the system can use the same schema to display any notification type. Because the ATC schema 400, the service schema 500, and the formatter schema 600 are all generic, the ATC 120, the notifications service module 130, the voyager-api 150, the flock 160, and the mobile device 170 remain agnostic to the actual notification type (including any newly introduced notification types). Consequently, no custom code is required in any of these components to support any and all newly introduced types.

The notifications formatter module 140 can be implemented as either a library or a service. Regardless of the implementation, the notifications formatter module 140 unifies into a single location all the shared logic for decorating and formatting notifications. Such a single location for shared logic for decorating and formatting notifications did not exist in prior notification systems. As a result, any and all modules that are responsible for ultimately delivering notifications to an application program interface (150) or to a mobile device (170) use the notifications formatter module 140 as a client. In short, the notifications formatter module 140 is the sole location in the online social networking system that is notification-type aware. In prior notification systems, there was not a single location that was notification-type aware. That is, it is the sole location that must be aware of all the different types of notifications. Consequently, the notifications formatter module 140 is the sole location where custom logic resides to decorate uniform resource names (URNs), and to format notification data specific to each notification type. Also, when a new notification type is introduced, the notification formatter module 140 is where a developer adds logic to format data for that new notification type. Additionally, because the notification formatter module 140 is this sole location, the logic for adding new notification types and formats does not have to be added to other locations, such as to an application programming interface or a client device. With the notifications formatter module 140, developers only have to change code in one place, and the output can be shared by APIs, client devices, and other entities. Although the logic of the notifications formatter module 140 is notification type-specific, its output is generic. Specifically, the notifications formatter module 140 outputs notification data using the generic formatter schema 600. This enables APIs, client devices, and other modules to be agnostic of the notification type (including newly introduced notification types). This design frees developers from having to make changes to any and all such APIs, client devices, and any and all other modules involved in the delivery of the notifications to a destination such as the flock 160.

With the notifications formatter module 140 in place, a client device 170 requests a member's notifications from an API 150. The API 150 makes a request to the notifications formatter module 140. The notifications formatter module 140 fetches notifications from the notifications service module 130, performs URN decoration, formats the data for each notification (e.g. actor image, headline, and social activity), returns the data to the API 150 as generic notification model objects using the generic formatter schema 600, and the API 150 returns these genetic notification model objects to the client 170.

In another embodiment, as further illustrated in FIG. 1, the ATC 120 contacts a flock module 160 to initiate a push notification. The flock module 160 makes a request to the notifications formatter module 140. The notifications formatter module 140 fetches a notification event from the notifications service module 130. The notifications formatter module 140 performs URN decoration, formats notification data (e.g. a member image associated with the notification), returns data to a shim layer 145 as generic notification model objects (generic formatter schema 600), and the shim layer 145 converts the model to a generic format suitable for the flock module 160.

The flock module 160 uses generic templates based on the generic formatter schema 600 to map data that are sent to a mobile device (e.g., Apple or Google) API 165, which essentially returns the generic formatter schema 600, which it receives from the notifications formatter module 140, all the way back to the client 170. In some embodiments, the flock module 160 cannot directly handle the generic formatter schema 600 that the notifications formatter module 140 returns to the mobile device API 165. Therefore, the shim module 145 introduces a shim layer in the notifications formatter module 140, whose sole purpose is to convert the generic formatter schema 600 to a different generic format suitable for the flock module. Such a generic format suitable for the flock module can be very similar to the formatter schema 600 (with less fields) and for example can take the following form:

```
{
  "name": "headerImage",
  "type": "Url"
},
{
  "name": "headline",
  "type": "string"
},
{
  "name": "subHeadline",
  "type": "string",
  "optional": true
},
{
  "name": "cardAction",
  "type": "Url"
}
```

Since the notifications formatter module 140's schema 600 is generic, and the shim output format is also generic, the shim layer is able to perform this conversion automatically, that is, without custom code, even when new notification types are introduced. More specifically, the flock module 160 receives these data from the shim module 145, and relies on generic templates to create the output to be sent to a client device 170, such as a smart phone with either an Apple or Google operating system. Since the templates are agnostic of any notification type (including new notification types), they can be re-used with current and future notification types without modification.

In some online social networking systems, render models are used to deliver content to a client device. Although the use of a render model has no design impact on the online social network servers, it has significant impact on the client, because render models represent a new generic model type for client devices. The render model can contain localized strings, and other information, that can be displayed to the member device without further formatting. The render model can also contain data that the client understands how to format. Render models also contain click-related data (either to perform an action, or to navigate to another page). In an embodiment, the generic render model is bound to a specific layout. In this manner, client devices are able to automatically bind data from the render model into views in this specific layout. Depending on what fields are set in the generic formatter schema, a client device would know what specific layout to use. For example, the CardContentType in FIG. 6A-1 can be used by clients to pick a particular layout, and also to know which other fields in the generic formatter schema contain data to populate into that layout.

Referring now to the drawings, FIG. 2 is a block diagram of the functional modules or components that comprise a computer-based or network-based online social networking service 10 consistent with some embodiments of the invention. As shown in FIG. 2, the online social networking service 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the present subject matter with unnecessary details, various functional modules and engines that are not germane to conveying an understanding of the present subject matter have been omitted from FIG. 2. However, a skilled artisan will readily recognize that various additional functional modules and engines may be used with an online social networking service, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although depicted in FIG. 2 as a three-tiered architecture, the present subject matter is by no means limited to such architecture.

As shown in FIG. 2, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 2, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online social networking service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online social networking service. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 2, consistent with some embodiments, the system may include additional databases for storing information relating to a wide variety of entities, such as information concerning various online or offline groups, job listings or postings, photographs, audio or video files, and so forth.

With some embodiments, the online social networking service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various applications, services and features of the online social networking service. For instance, a messaging application, such as an email application, an instant messaging application, or some hybrid or variation of the two, may be implemented with one or more application server modules 22. Of course, other applications or services may be separately embodied in their own application server modules 22.

The online social networking service may provide a broad range of applications and services that allow members the opportunity to share and receive information, often customized to the interests of the member. For example, with some embodiments, the online social networking service may include a photo sharing application that allows members to upload and share photos with other members. As such, at least with some embodiments, a photograph may be a property or entity included within a social graph. With some embodiments, members of an online social networking service may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online social networking service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 3:
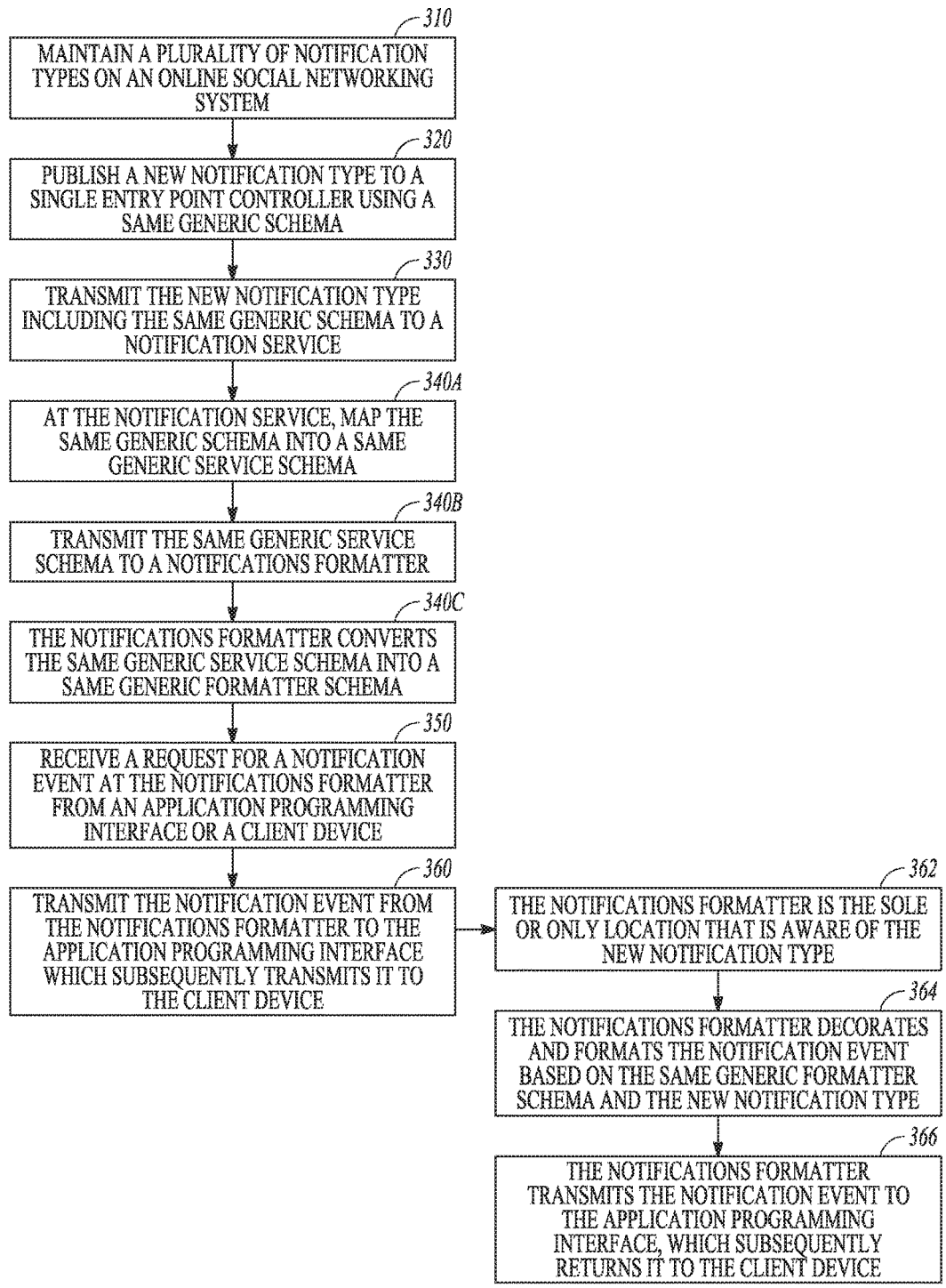
FIG. 3 is a flow diagram of an example embodiment of a process to onboard new notification types in an online social networking system.

FIG. 3 is a flow diagram illustrating an example method of creating a new notification type for an online social networking system. In various embodiments, the method may be implemented by one or more of the modules or processors of FIG. 1. FIG. 3 includes a number of process blocks 310-366. Though arranged substantially serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 3, at 310, an online social networking system, such as that illustrated in FIG. 1, maintains a plurality of notification types. Examples of notification types include such things as notifying a member of the online social networking system of another member's new job, a job anniversary of another member, or the birthday of another member.

At 320, the online social networking system publishes within the system a new notification type. As illustrated in FIG. 1, a notification event producer 110 publishes the new notification type, and as further illustrated in FIG. 1, this new notification type is published to a single entry point controller, which can also be referred to as an air traffic controller (ATC) 120. The single entry point controller comprises a single default module for all notification functions, and the notification functions include such functions as default aggregation rules, delivery time optimization, and user interface push configurations. In an embodiment, the new notification type includes a single generic notification event type that is used by all notification types in the online social networking system. As explained above, while there are different types of notifications, for example new job notifications and birthday notifications, all of these notifications use the same, single generic notification event type identifier and the same generic schema 400.

An example of a new notification type might be a recent graduation of a member from a higher institution of learning, or a member's college graduation anniversary. So, just as members are notified of a member's recent job change, members could now be notified of a member's recent graduation (or certification) and college graduation anniversary. Each new notification type, and the plurality of preexisting notification types, as indicated above, use the same generic schema 400. An example of this same generic schema is illustrated in FIG. 4. The same generic schema encapsulates the new notification type.

At 330, the same generic schema 400 that includes the new notification type is transmitted to the notification service processor or module 130 as illustrated in FIG. 1. At 340A, the notification processor 130 maps the same generic schema 400 into a same generic service schema 500. In an embodiment, the mapping of the same generic schema 400 into the same generic service schema 500 uses a pointer to retrieve content for the notification event. The notification processor 130 then stores the same generic service schema 500 into a database. An example of the same generic service schema 500 is illustrated in FIG. 5. Thereafter, at 340B, the notification processor 130 transmits the same generic service schema to the notification format processor 140, as is illustrated in FIG. 1.

At 340C, the notification format processor 140 converts the same generic service schema 500 into a same generic formatter schema 600. An example of the same generic formatter schema 600 is illustrated in FIG. 6. The functions implemented in the notification format processor 140 can use a library, or the functions can be implemented as a service.

At 350, the notification format processor 140 receives a request for a notification event from the application programming interface 150 or a mobile client device 170 (via the flock module 160 and the mobile device API 165). A notification event can include one or more types of notifications, such as two notifications that two other members have a work anniversary, another member has published an article, and yet another member has liked and/or shared a post of yet another member. The notification format processor 140 at 360 transmits the notification event to the application programming interface 150 or the mobile client device 170.

As indicated at 362, the notification format processor 140 is the sole or only location that is aware of the new notification type and the plurality of preexisting notification types. As noted above, because the notification format processor 140 is the only location that is aware of the new notification type and all of the other notification types on the online social networking system, a system developer of the online social networking system, when adding a new notification type, only has to install new logic to handle the new notification type at the notification format processor 140. That is, the developer does not have to make any changes to the notification event processor 110, the ATC 120, the notification service processor 130, the application programming interface 150, or the mobile device 170 (or the device's associated flock module 160 and the mobile device API 165).

At 364, the notifications format processor 140 decorates and formats the notification event based on the same generic formatter schema 600 and the new notification type or one of the several preexisting notification types. A decoration of the notification event can include such things as including the picture of the member to whom the notification event relates. An example of a notification event with a new notification type of 700 (college graduation anniversary) is illustrated in FIG. 7. FIG. 7 illustrates a notification event on a mobile device including a timestamp 710, content 720, and padding 730. In an embodiment, the notification event can include optional data such as embedded comments and further insight into the notification. At 366, after the notification event is decorated and formatted, the notification format processor 140 transmits the notification event to the application programming interface 150 or flock module 160 for ultimate delivery to the client device 170. As noted above, in an embodiment, the transmission of the notification event to the application programming interface 150 or the client device 170 by the notification format processor 140 can be executed with a render model.

Figure 8:
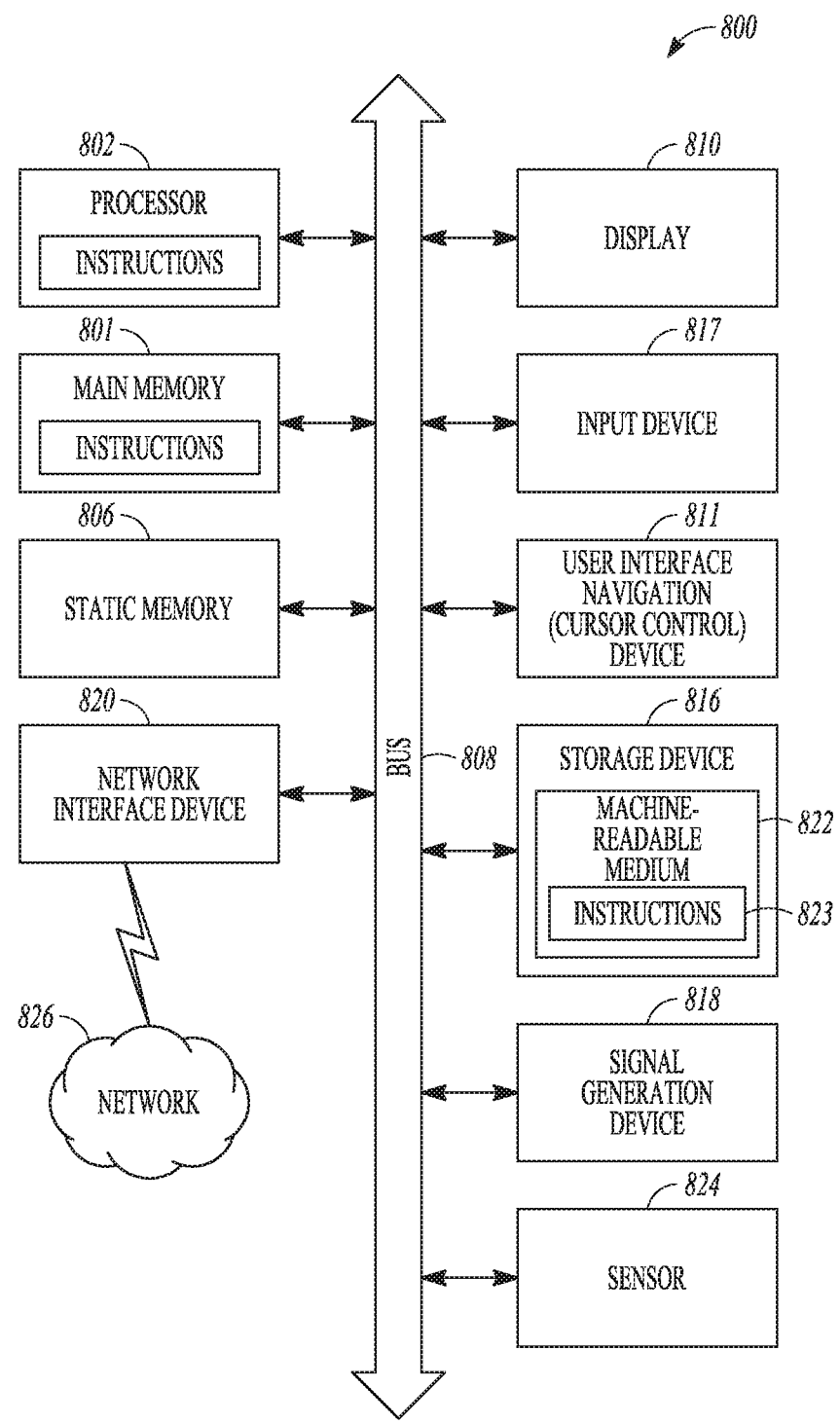
FIG. 8 is a block diagram of a machine in the form of a computing device within which a set of instructions, for causing the machine to perform any one or more of the methodologies discussed herein, may be executed.

FIG. 8 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 402 (e.g., a central processing unit (CPU), a graphics processing unit (GPU) or both), a main memory 401 and a static memory 406, which communicate with each other via a bus 408. The computer system 400 may further include a display unit 410, an alphanumeric input device 417 (e.g., a keyboard), and a user interface (UI) navigation device 411 (e.g., a mouse). In one embodiment, the display, input device and cursor control device are a touch screen display. The computer system 400 may additionally include a storage device 416 (e.g., drive unit), a signal generation device 418 (e.g., a speaker), a network interface device 420, and one or more sensors 421, such as a global positioning system sensor, compass, accelerometer, or other sensor.

The drive unit 416 includes a machine-readable medium 422 on which is stored one or more sets of instructions and data structures (e.g., software 423) embodying or utilized by any one or more of the methodologies or functions described herein. The software 423 may also reside, completely or at least partially, within the main memory 401 and/or within the processor 402 during execution thereof by the computer system 400, the main memory 401 and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks, magneto-optical disks; and CD-ROM and DVD-ROM disks.

The software 423 may further be transmitted or received over a communications network 426 using a transmission medium via the network interface device 420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A memory device, the memory device communicatively coupled to a processor and comprising instructions which, when performed using the processor, cause the processor to:
maintain a plurality of notification types on an online social networking system;
publish a new notification type to a single entry point controller on the online social networking system, wherein each new notification type and the plurality of notification types utilize a same generic schema;
transmit the same generic schema that includes the new notification type to a notification processor;
using the notification processor, map the same generic schema into a same generic service schema;
using the notification processor, transmit the same generic service schema to a notification formatter processor;
using the notification formatter processor, convert the same generic service schema into a same generic formatter schema; and
using the notification formatter processor, receive a request for a notification event from an application programming interface or a mobile client device and transmit the notification event to the application programming interface or the mobile client device;
wherein the notification formatter processor comprises a sole location that is aware of the new notification type and the plurality of notification types, wherein the notification formatter processor decorates and formats the notification event based on the same generic formatter schema and the new notification type or one of the plurality of notification types, and wherein the notification formatter processor transmits the notification event to the application programming interface and the application programming interface transmits the notification event to the mobile client device.

2. The memory device of claim 1, wherein the notification formatter processor utilizes a library or service to process the request for the notification event.

3. The memory device of claim 1, wherein the same generic schema encapsulates the new notification type.

4. The memory device of claim 1, wherein the single entry point controller comprises a single default module for all notification functions.

5. The memory device of claim 4, wherein the notification functions comprise default aggregation rules, delivery time optimization, and user interface push configurations.

6. The memory device of claim 1, wherein the new notification type comprises a single generic notification event type that is used by all notification types in the online social networking system.

7. The memory device of claim 1, wherein the notification event transmitted to the application programming interface or the mobile client device by the notification formatter processor comprises a render model.

8. The memory device of claim 1, wherein the mapping of the same generic schema into the same generic service schema comprises utilizing a pointer to retrieve content for the notification event.

9. A system comprising a computer processor operable to:
maintain a plurality of notification types on an online social networking system;
publish a new notification type to a single entry point controller on the online social networking system, wherein each new notification type and the plurality of notification types utilize a same generic schema;
transmit the same generic schema that includes the new notification type to a notification processor;
using the notification processor, map the same generic schema into a same generic service schema;
using the notification processor, transmit the same generic service schema to a notification formatter processor;
using the notification formatter processor, convert the same generic service schema into a same generic formatter schema; and
using the notification formatter processor, receive a request for a notification event from an application programming interface or a mobile client device and transmit the notification event to the application programming interface or the mobile client device;
wherein the notification formatter processor comprises a sole location that is aware of the new notification type and the plurality of notification types, wherein the notification formatter processor decorates and formats the notification event based on the same generic output model and the new notification type or one of the plurality of notification types, and wherein the notification formatter processor transmits the notification event to the application programming interface and the application programming interface transmits the notification event to the mobile client device.

10. The system of claim 9, wherein the notification formatter processor utilizes a library to process the request for the notification event.

11. The system of claim 9, wherein the same generic schema encapsulates the new notification type.

12. The system of claim 9, wherein the single entry point controller comprises a single default module for all notification functions.

13. The system of claim 12, wherein the notification functions comprise default aggregation rules, delivery time optimization, and user interface push configurations.

14. The system of claim 9, wherein the new notification type comprises a single generic notification event type that is used by all notification types in the online social networking system.

15. The system of claim 9, wherein the notification event transmitted to the application programming interface or the mobile client device by the notification formatter processor comprises a render model.

16. The system of claim 9, wherein the mapping of the same generic schema into the same generic service schema comprises utilizing a pointer to retrieve content for the notification event.

17. A process comprising:
maintaining a plurality of notification types on an online social networking system;
publishing a new notification type to a single entry point controller on the online social networking system, wherein each new notification type and the plurality of notification types utilize a same generic schema;
transmitting the same generic schema that includes the new notification type to a notification processor;
using the notification processor, mapping the same generic schema into a same generic service schema;
using the notification processor, transmitting the same generic service schema to a notification formatter processor;
using the notification formatter processor, converting the same generic service schema into a same generic formatter schema; and
using the notification formatter processor, receiving a request for a notification event from an application programming interface or a mobile client device and transmitting the notification event to the application programming interface or the mobile client device;
wherein the notification formatter processor comprises a sole location that is aware of the new notification type and the plurality of notification types, wherein the notification formatter processor decorates and formats the notification event based on the same generic formatter schema and the new notification type or one of the plurality of notification types, and wherein the notification formatter processor transmits the notification event to the application programming interface and the application programming interface transmits the notification event to the mobile client device.

18. The process of claim 17, wherein the notification formatter processor utilizes a library to process the request for the notification event; and wherein the same generic schema encapsulates the new notification type.

19. The process of claim 17, wherein the single entry point controller comprises a single default module for all notification functions; and wherein the notification functions comprise default aggregation rules, delivery time optimization, and user interface push configurations.

20. The process of claim 17, wherein the new notification type comprises a single generic notification event type that is used by all notification types in the online social networking system; wherein the notification event transmitted to the application programming interface or the mobile client device by the notification formatter processor comprises a render model; and wherein the mapping of the same generic schema into the same generic service schema comprises utilizing a pointer to retrieve content for the notification event.

* * * * *